Sept. 2, 1969  M. C. E. HENRION  3,464,669
CONTROL SYSTEM FOR BUTTERFLY VALVES
Filed April 22, 1968
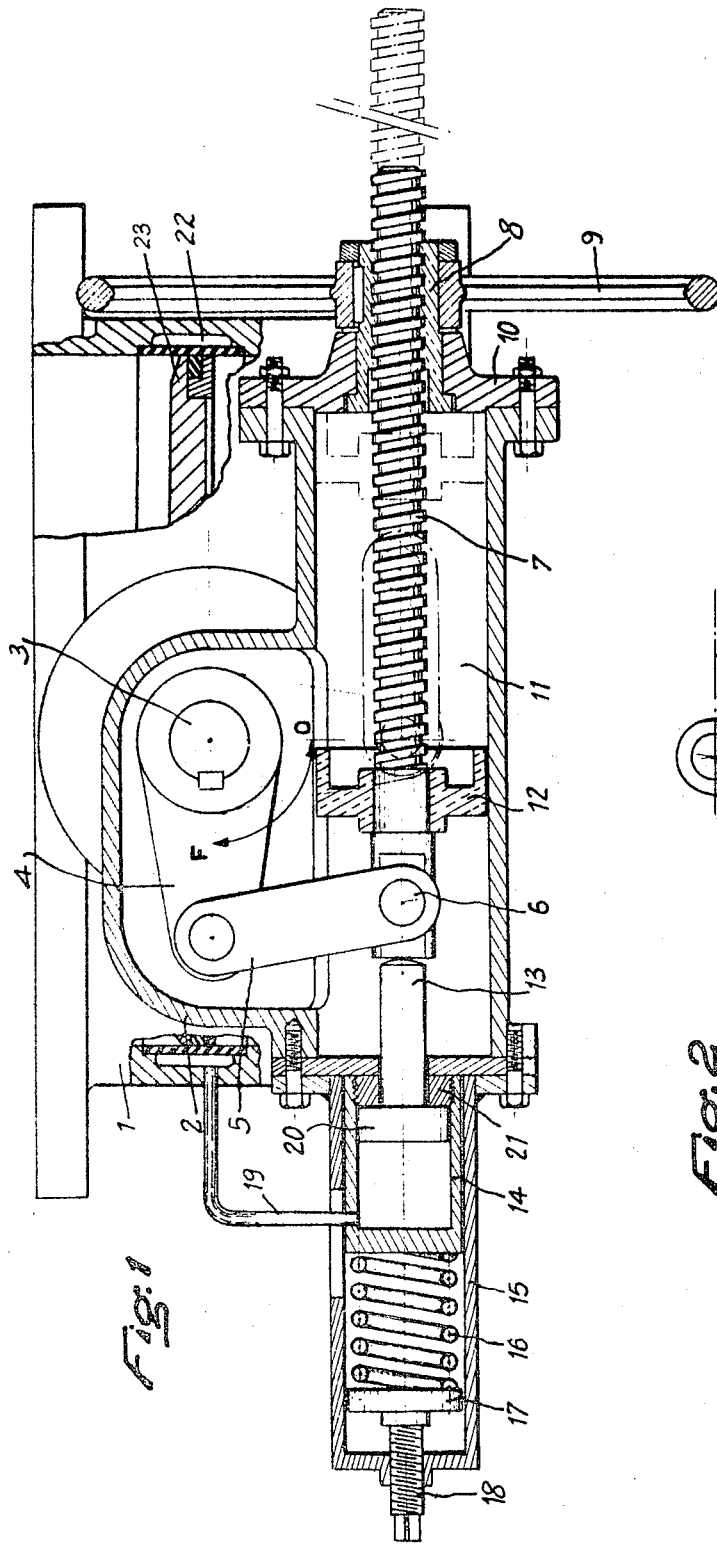
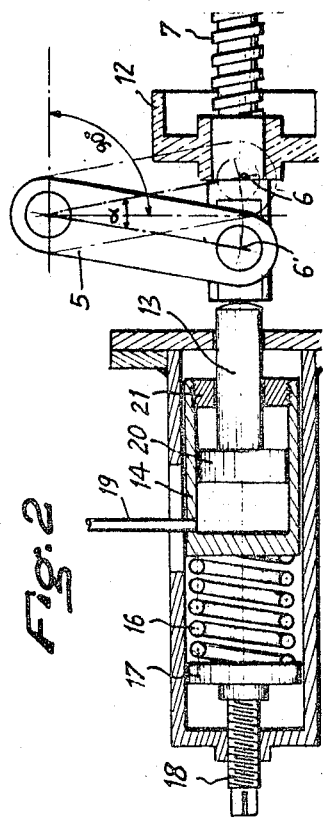
INVENTOR
MARIE CHARLES EMILE
HENRION
BY Young + Thompson
ATTYS

United States Patent Office 3,464,669
Patented Sept. 2, 1969

3,464,669
CONTROL SYSTEM FOR BUTTERFLY VALVES
Marie Charles Emile Henrion, 11 Rue Hermite,
Nancy, France
Continuation-in-part of application Ser. No. 504,365,
Oct. 24, 1965. This application Apr. 22, 1968, Ser.
No. 722,938
Claims priority, application France, Dec. 4, 1964,
997,416
Int. Cl. F16k *25/02, 1/22*
U.S. Cl. 251—173                                 1 Claim

ABSTRACT OF THE DISCLOSURE

An arrangement for inflating an annular oil-filled deformable chamber fitted between an inwardly cylindrical valve casing and a throttle valve to ensure fluid-tightness of the latter, wherein the closing of the throttle valve is associated with a hydraulic system maintaining constancy of the oil pressure in the deformable chamber and including a closed liquid-filled cylinder connected permanently and unobstructedly with said chamber. Said cylinder encloses a piston the rod of which is driven by the mechanism acting on the throttle valve so as to deliver oil into said chamber. The leaks and variations of pressure on the oil body are compensated by a relative shifting of the cylinder with reference to the piston as provided by a spring controlling the position of the slidingly carried cylinder.

---

The present application is a continuation in part of my specification Ser. No. 504,365, filed Oct. 24, 1965 and now abandoned.

My prior Patent 3,034,760 disclosed an arrangement controlling the pressure of oil inside a deformable chamber extending along the inner periphery of a casing enclosing a throttle valve and adapted to fluid-tightly engage the outer surface of said throttle valve. In said prior specification, the mechanism controlling the throttle valve also controls means urging oil into said chamber so as to maintain it in an inflated condition. My present invention covers a similar arrangement also applicable in the case of my copending specification Ser. No. 504,364, filed Oct. 24, 1965, now Patent No. 3,414,234 and entitled: "Fluid-Tight System for Throttle Valves."

My present invention has for its object means for maintaining constancy of the oil pressure in such prior arrangements in spite of the modifications in volume ascribable to heat and to any possible leaks. This is obtained by freely opening the oil-filled chamber into a closed liquid-filled cylinder adapted to slide against the thrust of the spring, which ensures constancy of the pressure inside the unitary container constituted by said chamber and cylinder.

I have illustrated, by way of example, in the accompanying drawing a preferred embodiment of my invention.

In said drawings:

FIG. 1 illustrates the control system for the throttle or butterfly valve ensuring pressure constancy.

FIG. 2 is a fragmentary view of the same system for a different position thereof.

The throttle valve inside the casing 1 is controlled by a mechanism carried inside the cover 2. The spindle 3 controlling the throttle valve is rigid with a crank 4 to the end of which is pivotally secured a link 5 pivotally secured in its turn at 6 to the end of a worm 7.

Said worm 7 is controlled by a nut 8 rigid with a hand wheel 9. Said nut 8 is held against axial movement by the cap 10 secured to the end of a sleeve 11 rigid with the cover and enclosing the worm 7 while a cylindrical slide valve 12 constituted by a piston rigid with the worm adjacent the pivotal connection 6 is guided inside the sleeve 11.

It is apparent that, if the handwheel 9 and nut 8 are caused to revolve clockwise for an observer located on the right hand side of FIG. 1, the nut 8 which is held against axial movement constrains the worm to move towards the right hand side of FIG. 1. Consequently, by reason of the presence of the link 5 and crank 4, the spindle 3 controlling the throttle valve will rock through an angle of about 90° and move from its closed position F into its open position O, the control mechanism 4, 5, 6 being illustrated in dot-and-dash lines for said latter position.

The slide valve 12 absorbs the stresses perpendicular to the axis of the worm, which stresses transmitted by the link 5 are produced by the torque exerted on the spindle 3 controlling the throttle valve in both directions.

FIG. 1 illustrates the worm 7 in the position corresponding to the closing of the throttle valve, as obtained by rotating the handwheel 9 anticlockwise for an observer located on the right-hand side of FIG. 1, i.e., the side opposed to the mechanism. The actual throttle valve which is not illustrated engages in its closed position an abutment inside its casing and is held fast in said closed position.

The mechanism is adjusted in a manner such that at the moment of the closing of the valve, the end of the worm 7 engages exactly the end of a rod 13 rigid with the piston 20 of a cylinder 14 carrying oil in one compartment to the left-hand side of the piston while the link 5 and crank 4 are substantially at right angles with each other.

The handwheel 9 being caused to continue rotating in an anticlockwise direction, it is apparent that the worm 7 progresses towards the left-hand side. Said progression is illustrated in FIG. 2, the angle α defining the further shifting obtained for the link 5, the bisecting line of which angle is perpendicular to the axis of the crank; this angle should be small, of a magnitude of 5 to 10° for instance the pivotal connection 6 thus entering the position 6'.

If the crank 4 were rigid with the spindle 3, the center of the pivotal connection when it passes from 6 to 6' should describe an arc of a circle, but since the spindle 3 connecting the crank with the throttle valve is sufficiently long, said spindle acts after the manner of a torsion bar and allows the end of the crank at 6 to move radially by a length which is equal to the sag of the theoretical arc connecting the points 6, 6', since the actual path of the pivot between said points is necessarily a straight line as provided by the slide valve 12.

My invention covers the behavior of the cylinder 14 feeding through a pipe 19 an oil-filled chamber 22 surrounding the location of the throttle valve 23 inside its casing, so as to ensure fluid-tightness between the valve and its casing when the valve is in its closed position. Said chamber is closed on its inner side in the case illustrated by a deformable ferrule; but it may as well be constituted by a ferrule adapted to bulge both outwardly and inwardly, said ferrule being in the shape of a radially flattened tore. The cylinder 14 is housed inside a sheath 15 containing also a coil spring 16 operating under compression and urged against the bottom of the cylinder by a plate 17 carried by the end of a screw 18 exerting an adjustable pressure on said plate.

The shifting of the rod 13 of the jack piston 20 over a distance equal to 6–6' by the worm 7 causes the oil contained in the cylinder 14 to enter the deformable oil-filled chamber 22 through the pipe 19 and this produces a rise in pressure of the oil, an expansion of said deformable chamber and a tightening of said chamber 22 round the periphery of the throttle valve when closed which ensures the desired fluid-tightness for the latter. This result is obtained for a maximum predetermined pressure. To this end, the compression of the spring 16 engaging the cylinder 14 is adjusted in a manner such that it balances the maximum predetermined thrust to be exerted by the oil on the bottom of the cylinder 14. Under such conditions, if the shifting 6–6' is larger than the shifting of the jack piston 20 required for obtaining said maximum pressure, the spring 16 will yield, and allow the cylinder to recede inside its sheath 15, as illustrated in FIG. 2.

Said receding movement of the cylinder 14 allows a fraction of the oil located underneath the piston to act as a provision which ensures automatically the fluid-tightness of the valve when a loss of oil appears with time as a consequence of leaks through the joints connecting the pipe 19 with the oil-filled chamber 22 providing fluid-tightness.

As a matter of fact, if the amount of oil in the oil-containing unit comprising the cylinder 14, the pipe 19 and the oil-filled chamber 22 diminishes, the piston 20 will no longer recede towards the position corresponding to the opening of the throttle valve and illustrated in FIG. 1 and the space between the piston 20 and the bottom 21 of the cylinder opposed to the cylinder compartment which is filled with oil increases, the end of the rod 13 is consequently no longer in contact with the end of the worm 7 when the pivotal connection 6 between the link 5 and the worm 7 returns into the position 6.

The oil-filled section of the cylinder 14 is thus reduced by the relative shifting of said cylinder 14 over the piston 20 under the action of the spring 16 and consequently the pressure in the said oil-filled section and the chamber surrounding the valve remains unaltered. The thrust exerted by the worm 7 on the piston rod 13 is consequently inoperative during the first portion of the progression of the worm 7 until the worm actually reaches the piston rod. The desired oil pressure is thus maintained at the value defined by the spring 16 as long as there is enough oil to make said spring 16 yield slightly when the pivot 6 has reached the end 6' of its forward travel.

It is thus apparent that the provision of oil in the cylinder 20 compensates the modifications in pressure of the oil enclosed in the above-defined unit constituted by the cylinder, the pipe 19 and the oil-filled chamber surrounding the valve, which modifications are ascribable not only to leaks but also to variations in temperature expanding or contracting the mass of oil carried in said unit. This compensation is obtained automatically by the spring 16 balancing the pressure at any time.

Thus the means provided for compensating the modifications in volume of oil and consequently in pressure due to modifications in temperature and to leaks are compensated by subjecting the unitary container constituted by the cylinder and the oil chamber to the action of a spring.

I claim:
1. In combination with a system including a throttle valve, an inwardly cylindrical valve casing, a throttle valve mounted to pivot inside said casing between a closed position engaging the inner wall of the casing and an open position, and an actuating mechanism controlling the pivotal movement of the valve mounted on said casing and including a threaded member mounted for reciprocating movement and lever means connecting said member to said throttle valve to impart rotary movement thereto, the provision of an arrangement ensuring fluid-tightness between the valve and its casing and comprising a closed cylinder having a pair of opposite end walls, a piston slidingly engaging said cylinder and defining therein to one side of said piston an oil-filled compartment, an annular deformable oil-filled chamber fitted between the location of the periphery of the valve in its closed position and the inner wall of the casing, a pipe connecting unobstructedly and permanently said oil-filled compartment with said annular chamber to form a single closed oil-filled container with said compartment and with said chamber, a rod rigid with the piston, extending out of the cylinder through said end wall thereof and being in axial alignment with said threaded member, a sheath mounted on said casing in which the cylinder is positioned to slide, said sheath having an end wall through which said piston rod extends, a spring engaging the end of the cylinder opposed to the piston rod and exerting thereon a pressure opposing that to which the cylinder is subjected by the oil carried in said oil-filled compartment and compressed by the piston upon actuation of the mechanism and means adjusting the pressure of the spring to allow its yielding for a predetermined oil pressure opposed by it, said threaded member of said controlling mechanism bearing axially against said piston rod in said closed position of the valve to compress the spring and being spaced a predetermined distance from said piston rod in said open position of the valve in which latter position said spring urges the cylinder against said end wall of the sheath, and actuation of said threaded member moving said throttle valve to a closed position and with continued travel through at least a portion of said predetermined distance engaging said piston rod to effect pressurization of the oil within the cylinder.

References Cited

UNITED STATES PATENTS

| 2,081,842 | 5/1937 | Sharp | 251—173 |
| 2,484,387 | 10/1949 | Miller | 103—37 |
| 3,034,760 | 5/1962 | Henrion | 251—173 |

FOREIGN PATENTS 879,522 10/1961 Great Britain.

HAROLD W. WEAKLEY, Primary Examiner

U.S. Cl. X.R.

251—188, 307